United States Patent
Ball et al.

[15] 3,685,544

[45] Aug. 22, 1972

[54] HIGH PRESSURE PACKING CUP

[72] Inventors: Frank C. Ball, Long Beach; Willard E. Knapp, Lake San Marcos, both of Calif.

[73] Assignee: Hydro-Test, Inc., Long Beach, Calif.

[22] Filed: Feb. 5, 1971

[21] Appl. No.: 112,971

[52] U.S. Cl. .................................... 138/90, 138/89
[51] Int. Cl. ............................................ F16l 55/10
[58] Field of Search ................................. 138/89, 90

[56] References Cited

UNITED STATES PATENTS

| | | | |
|---|---|---|---|
| 1,050,557 | 1/1913 | McLaughlin | 138/89 X |
| 2,704,090 | 3/1955 | Potts | 138/90 |
| 2,818,086 | 12/1957 | Foth | 138/89 |
| 2,974,685 | 3/1961 | Ver Nooy | 138/90 |
| 3,032,069 | 5/1962 | Ficklin | 138/89 |
| 3,216,456 | 11/1965 | LaVoie | 138/90 |

*Primary Examiner*—Herbert F. Ross
*Attorney*—William C. Babcock

[57] ABSTRACT

A packing cup that is mountable on a collar secured to a mandrel to hydraulically test tubing or pipe at high fluid pressures, and without the elastomeric material defining the cup cold flowing to a detrimental degree. When the cup and mandrel are disposed within the interior of tubing or pipe, and the cup subjected to fluid pressure, the cup is deformed towards the collar to radially expand into fluid sealing contact with the interior surface of the tubing or pipe being tested, but with the portion of the cup adjacent the collar not expanding radially to the degree that the portion of the cup situated thereabove. Due to this limitation of radial expansion of said lower portion there is a minimum tendency of the elastomeric material to cold flow into the annulus-shaped space that exists between the collar and the interior surface of the tubing or pipe, and the cup may be used to test a number of strings of tubing or pipe.

5 Claims, 3 Drawing Figures

FIG.1
FIG.2
FIG.3
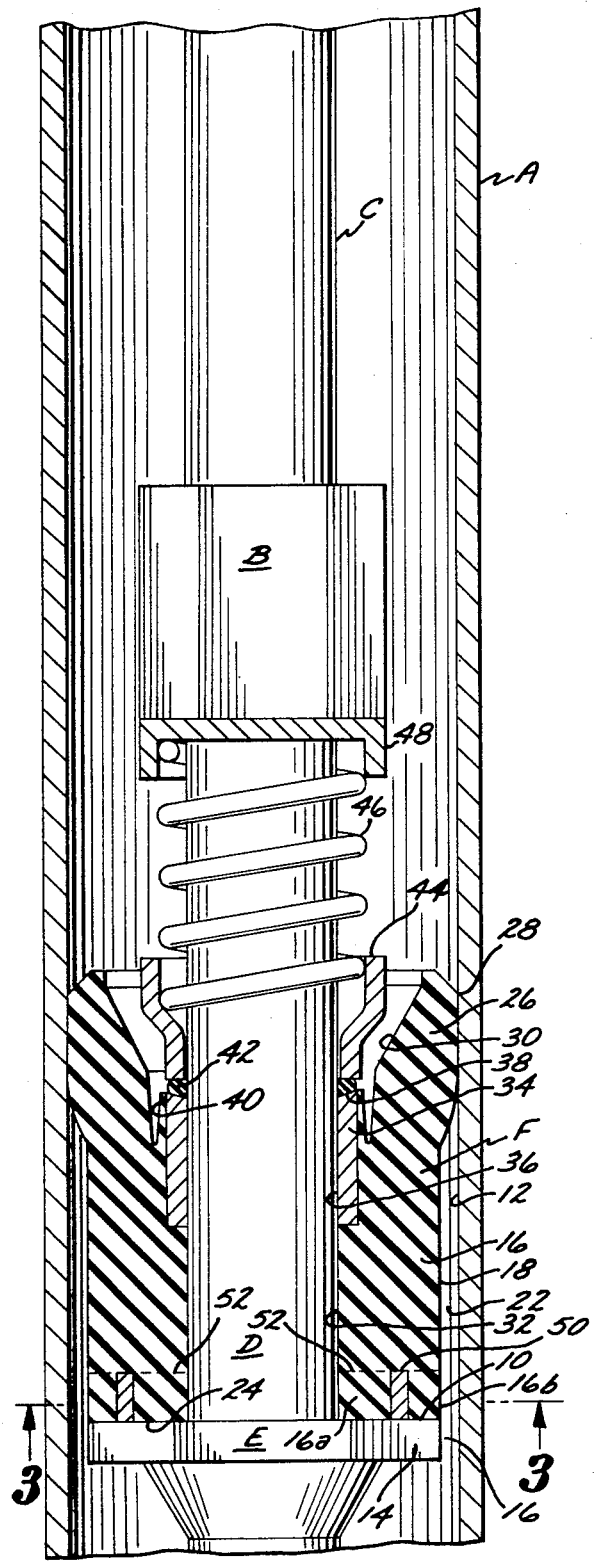
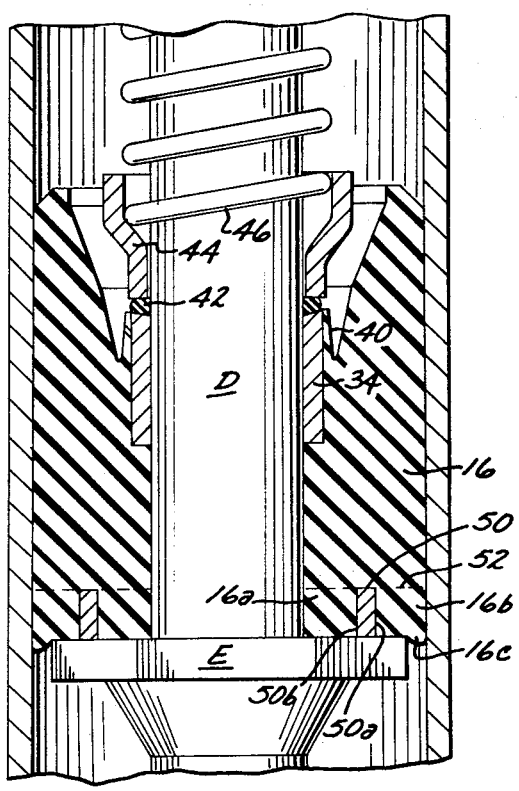
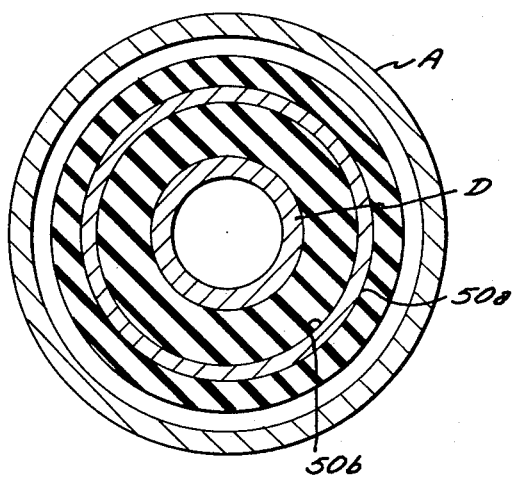
INVENTOR.
FRANK C. BALL
BY WILLARD E. KNAPP
William G. Babcock
ATTORNEYS

HIGH PRESSURE PACKING CUP

BACKGROUND OF THE INVENTION

1. Field of the Invention

High pressure packing cup.

2. Description of the Prior Art

Packing cups formed from an elastomeric material have in the past been used with an elongate mandrel to hydraulically test tubing or pipe. Such cups are normally mounted on a collar secured to the mandrel, with the diameter of the collar being substantially less than the interior diameter of the tubing or pipe being tested to permit longitudinal movement of the packing cup assembly therethrough.

When a testing operation is conducted with fluid at high pressure, the previously available packing cups are deformed both longitudinally and radially, and to the extent that a portion of the elastomeric material defining the cup cold flows into the space between the external surface of the collar and interior surface of the tubing or pipe. After such cold flow of the elastomeric material has taken place, the cup is valueless for future testing purposes, and must be discarded.

The primary purpose in devising the present invention is to provide a high pressure packing cup that has an extremely simple structure, and one that substantially overcomes the operational deficiencies of previously available packing cups.

SUMMARY OF THE INVENTION

A packing cup that includes a body formed from an elastomeric material, which cup is removably mounted on an elongate mandrel that extends longitudinally therethrough. The cup seats on a collar of said mandrel. Spring means are employed to hold said cup at a fixed position on said mandrel and in seating engagement with the collar.

A rigid ring of substantial height is embedded in the elastomeric material defining the body of the cup, with the ring extending upwardly from the lower flat surface of the cup that is in seating engagement with the collar. The ring is of such diameter that the ring is substantially closer to the external surface of the body than the interior surface of the cup that defines a longitudinally extending bore. When the cup is subjected to fluid pressure on the end thereof most remote from the collar, the cup is deformed longitudinally towards the collar, and concurrently expanded radially into sealing engagement with the interior surface of the tubing or pipe being tested. The annulus-shaped section of the body of the cup situated outwardly from the ring is subjected to the same deforming force as the balance of the cup, but this section, due to it being relatively thin, deforms radially towards the interior surface of the tubing or pipe a substantially lesser degree than the portion of the cup situated above the ring. Due to the limited radial deformation of this section of the cup, there is little or no tendency for the section when radially expanded to cold flow into the annulus-shaped space between the walls and interior surface of the tubing or pipe being tested. Consequently, a packing cup embodying the concept of the present invention may be used over and over again without deforming to the extent that it is rendered useless for testing purposes.

A major object of the present invention is to provide a high pressure packing cup that is removably mountable on a mandrel and adapted to seat against a collar that occupies a fixed position on said mandrel, with said packing cup when so disposed capable of being used in the hydraulic testing of pipe or tubing at high pressures, and without the cup being permanently deformed to the extent that it is not useful for future testing purposes.

Another object of the invention is to provide a high pressure packing cup that has a relatively simple mechanical structure, is simple and inexpensive to produce, is effective and reliable in operation, and one that may be used for sequentially testing a number of strings of tubing or pipe without requiring replacement.

BRIEF DESCRIPTION OF THE DRAWING

FIG. 1 is a longitudinal cross sectional view of a section of tubing or pipe that has a mandrel extending downwardly therein, with the mandrel supporting a packing cup that does not permanently deform when subjected to high pressure hydraulic fluid, and said cup being shown in the non-deformed position it occupies prior to being subjected to said hydraulic fluid;

FIG. 2 is the same longitudinal cross sectional view of the packing cup shown in FIG. 1, but with the cup having been radially expanded into sealing contact with the interior surface of the tubing or pipe by the application of high pressure hydraulicfluid to the interior of said tubing or pipe; and FIG. 3 is a transverse cross sectional view of the packing cup shown in FIG. 1 taken on the line 3—3 thereof.

DESCRIPTION OF THE PREFERRED EMBODIMENT

A vertically disposed section of a length of tubing or pipe A that is to be hydraulically tested is shown in FIG. 1. A nut B or other suitable fastening means connects a first elongate mandrel C to a second elongate mandrel D which second mandrel D has a collar E mounted on a fixed position thereon. The collar E has a flat upper face 10. Collar E is of substantially less diameter than the interior surface 12 of the pipe A. The collar E has an outer edge surface 14.

The packing cup assembly F includes a cylindrical body 16 from an elastomeric material such as rubber or the like, with the body 16 having an external surface 18 that is substantially flush with the surface 14. The cylindrical surface 18 and interior surface 12 of the tubing A cooperate to define an annulus-shaped space 22 therebetween as shown in FIG. 1. The body 16 has a first flat end surface 24 that is in abutting contact with surface 10 of collar E. The body 16 as may best be seen in FIG. 1 has a circumferentially extending lip 26 defined on the upper portion thereof, which lip has a longitudinally extending exterior surface 28 that is at all times in slidable contact with the interior surface 12 of the tubing A. The lip 26 is also particularly defined by a circumferentially extending interior tapered surface 30 as shown in FIG. 1 that tapers downwardly and inwardly. Bore 32 extends longitudinally through the cup F. Bore 32 is engaged by the second mandrel D. A rigid metallic tube 34 of appreciable thickness is embedded in the upper interior portion of the body 16. The interior longitudinal bore 36 of tube 34 is in communication with bore 32. Tube 34 has a circumferentially extending, inwardly tapering seat 38 defined on the upper portion thereof as shown in FIG. 1. The upper portion of the tube 34 preferably has a bead 40 of the elastomeric material defining the body 16 extenting upwardly around the exterior surface thereof as shown in FIG. 1.

Resilient sealing ring 42 encircles the second mandrel D and rests on the seat 38. A first tubular member 44 is at all times urged downwardly to pressure contact resilient sealing ring 42 by a compressed helical spring 46 that encircles the second mandrel D. The upper end of the spring 46 is held at a fixed position relative to the nut B by a flanged member 48 that has a bore (not shown) therein through which the second mandrel D extends. The first and second mandrel C and D both have adjacently disposed threaded ends (not shown) that engage a tapped bore (not shown) formed in the nut B.

A rigid ring 50 is embedded in the resilient material defining the body 16, with the ring extending upwardly from the first flat end surface 24 as shown in FIG. 1. The ring 50 is of such diameter that the external surface 50a thereof is substantially closer to the external surface 18 of body 16 than is the interior surface 50b of the ring to the portion of the body that defines the bore 32.

The ring 50 serves to divide the lower portion of the body 16 into inner and outer ring-shaped sections 16a and 16b, with the upper limits of these sections being indicated in FIG. 1 and 2 by a phantom line 52. When hydraulic fluid under pressure is discharged into the interior of the tubing or pipe A above the packing cup F, the pressurized fluid exerts a downwardly directed force on the packing cup F that causes the body 16 to contract longitudinally and expand radially as shown in FIG. 2, with the portion of the body 16 above the phantom line 52 deformed three dimensionally to sealingly contact the interior surface of the second mandrel B. The compressive force exerted on the portion 16 above the phantom line 52 is, of course transferred to the inner section 16a but this section can forego little deformation as it is confined between surface 50b of ring 50, the external surface of the second mandrel D, and the upper surface 10 of collar E.

When the portion of the body 16 above phantom line is deformed downwardly to radially expand as shown in FIG. 2, a similar downward force is exerted on the outer section 16b to cause radial deformation of this section. However, the section 16b is substantially thinner than the portion 16 of the body thereabove, and as a result the section 16b has relatively little radial deformation. The height of the ring 50, and the radial spacing of the surface 50a thereof from external surface 18 of body 16 is so chosen that when the cup F is longitudinally and radially deformed, the outer section 16b fills a portion of the space 22 adjacent thereto. Due to the outer section 16b being limited as to deformation by the ring surface 50a, surface 10, and the portion of the body 16 situated above the section, the section 16b can only deform radially.

However, if the radial deformation of section 16b is sufficiently great as to fill the space 22 situated adjacent thereto, a slight bulge 16c may occur in the deformed portion 16b as shown in FIG. 2, but not sufficient for cold flow of the resilient material to occur.

When pressure is released from the interior of the tubing A, the packing member F will due to the resilient nature of the material defining the same return to the configuration shown in FIG. 1, and without any damage being done to the packing cup F due to permanent deformation thereof.

The pressure exerted by the spring 46 on member 44, causes transverse deformation of the ring 42 to urge the ring into sealing contact with the external surface of the second mandrel D to prevent the flow of fluid downwardly between the external surface of the second mandrel D and the bore 32.

The use and operation of the invention has been discussed previously in detail and need not be repeated.

We claim:

1. In combination with an elongate rigid mandrel that supports a circular collar of such diameter that the circumferential edge of said collar is radially spaced from the interior surface of a tubular member that is to be tested hydraulically, a packing cup formed from an elastomeric material, said cup being in the form of a cylinder that has a flat first end surface that abuts against a flat second end surface of said collar, said cup having a bore extending longitudinally therethrough that is engaged by said mandrel, said cup having first and second end portions, said first end portion partially defined by said first end surface and having substantially the same transverse cross section as that of said collar, with said second end portion being at least partially defined by an outwardly projecting circumferentially extending lip that has an outer ring-shaped surface that slidably contacts the interior surface of said tubular member and an oppositely positioned ring-shaped interior surface that is contacted by pressurized fluid used in testing said tubular member, said packing cup being characterized by:

a. a rigid ring of substantial height that extends longitudinally into said first end portion from said first end face thereof and is intermediately positioned between said bore and the external surface of said first end portion, said ring dividing said first end portion into inner and outer annulus-shaped sections, with pressurized fluid when discharged into said tubular member above said packing cup three dimensionally deforming the same towards said collar to longitudinally shorten said cup and radially expand the portion of said cup between said lip and said ring into sealing contact with the interior surface of said tubular member, and said longitudinally and radially deformed portion exerting longitudinal forces on said inner and outer sections to radially deform said inner section inwardly into sealing contact with said mandrel and said outer section outwardly towards said inner surface of said tubular member, but said outer section expanding radially but a fraction of the distance of the portion of said cup above said ring expands due to the lesser thickness of said outer section, and said outer section when radially expanded tending to fill the space that existed between it and the interior surface of said tubular member when said cup was not deformed rather than extruding downwardly as a circumferentially extending bead in the annulus-shaped space between the outer surface of said collar and the interior surface of said tubular member; and b. first means operatively associated with said second end portions for preventing said pressurized fluid from flowing longitudinally between said bore and mandrel towards said collar.

2. A packing cup as defined in claim 1 in which the exterior surface of said ring is substantially closer to the exterior surface of said first end portion than said exterior surface is to the surface of said first end portion that defines said bore.

3. A packing cup as defined in claim 1 in which the height of said ring and the radial spacing of the exterior surface of said ring relative to the exterior surface of said first end portion are so selected relative to the maximum pressure to which said cup is to be subjected that when said cup deforms due to said maximum pressure being applied thereto there is no substantial cold flow of said material between the exterior surface of said collar and the interior surface of said tubular member.

4. A packing cup as defined in claim 1 in which said first means comprises:
   c. a longitudinally positioned rigid tube embedded in said second end portion of said packing cup in communication with said bore, with said tube defining a circumferential, inwardly tapering seat on a first end thereof;
   d. a resilient ring encircling said mandrel and resting on said seat; and
   e. spring means for forcing said resilient ring into sealing contact with said seat and mandrel.

5. A packing cup as defined in claim 4 in which said spring means is a compressed helical spring that encircles said mandrel and has a first end held at a fixed position relative thereto and a second end of said spring in pressure contact with said resilient ring.

* * * * *